(12) United States Patent
Sethi

(10) Patent No.: US 10,693,724 B1
(45) Date of Patent: Jun. 23, 2020

(54) CONTEXT-SENSITIVE TECHNIQUES FOR OPTIMIZING NETWORK CONNECTIVITY

(71) Applicant: Amazon Technologies, Inc., Seattle, WA (US)

(72) Inventor: Tushaar Sethi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 112 days.

(21) Appl. No.: 14/631,600

(22) Filed: Feb. 25, 2015

(51) Int. Cl.
*H04L 12/24* (2006.01)
*H04L 29/06* (2006.01)
*H04L 29/08* (2006.01)

(52) U.S. Cl.
CPC ........ *H04L 41/0823* (2013.01); *H04L 67/327* (2013.01); *H04L 67/42* (2013.01)

(58) Field of Classification Search
CPC .................................................. H04L 41/0823
USPC .......................................................... 709/203
See application file for complete search history.

(56) References Cited

U.S. PATENT DOCUMENTS

| | | | | |
|---|---|---|---|---|
| 5,590,119 A * | 12/1996 | Moran | ..................... | H04L 12/14 370/225 |
| 6,032,175 A * | 2/2000 | Fletcher | ............ | H04L 29/12009 709/200 |
| 6,252,952 B1 * | 6/2001 | Kung | ..................... | H04M 3/44 379/114.02 |
| 7,035,281 B1 * | 4/2006 | Spearman | ........... | H04L 12/4604 370/401 |
| 7,523,170 B1 * | 4/2009 | Allen | ..................... | G06F 15/173 709/217 |
| 7,801,992 B2 * | 9/2010 | Gibbons | ................. | H04L 12/14 709/220 |
| 8,200,790 B1 * | 6/2012 | Reeves | ..................... | G06F 8/60 709/220 |
| 8,572,366 B1 * | 10/2013 | Yadav | ..................... | H04L 63/08 713/154 |
| 8,688,775 B2 * | 4/2014 | Penno | ................... | H04L 67/104 709/203 |
| 8,751,613 B1 * | 6/2014 | Medved | ................. | H04L 45/00 370/229 |
| 8,789,173 B2 * | 7/2014 | Narayanaswamy | ........................ | H04L 63/1458 709/224 |
| 8,924,581 B1 * | 12/2014 | Acharya | ............... | H04L 65/608 370/395.5 |

(Continued)

OTHER PUBLICATIONS

Merriam-Webster, "processor", 2014.*

(Continued)

*Primary Examiner* — Ondrej C Vostal
(74) *Attorney, Agent, or Firm* — Davis Wright Tremaine LLP

(57) ABSTRACT

Techniques described and suggested herein include systems and methods for optimizing network connections by using attributes of one or more of the connected entities. For example, a routing engine may be implemented to determine, based on various attributes of a client device, its desired destination, and/or the networks capable of connecting the client device and the destination, optimized parameters and routes for the network connection. Such optimization may involve the selection of an optimal network, the negotiation of an optimal connection type, and the like. The optimization may be made for one or more disparate criteria, such as data security, bandwidth, network latency, geographical proximity, and so forth.

21 Claims, 8 Drawing Sheets

(56) References Cited

U.S. PATENT DOCUMENTS

| | | | | |
|---|---|---|---|---|
| 8,959,139 B2* | 2/2015 | Medved | ................ | H04L 45/00 709/201 |
| 9,660,886 B1* | 5/2017 | Ye | ................ | H04L 43/0823 |
| 2002/0028656 A1* | 3/2002 | Yemini | ................ | H04L 29/12009 455/41.2 |
| 2002/0069278 A1* | 6/2002 | Forslow | ................ | H04L 63/0227 709/225 |
| 2002/0078383 A1* | 6/2002 | Leerssen | ................ | H04L 63/104 726/13 |
| 2002/0080752 A1* | 6/2002 | Johansson | ................ | H04L 29/06 370/338 |
| 2004/0015582 A1* | 1/2004 | Pruthi | ................ | H04L 41/142 709/224 |
| 2005/0111453 A1* | 5/2005 | Mizutani | ................ | H04L 12/56 370/390 |
| 2005/0114541 A1* | 5/2005 | Ghetie | ................ | H04L 47/10 709/232 |
| 2006/0098645 A1* | 5/2006 | Walkin | ................ | H04L 63/123 370/389 |
| 2006/0117110 A1* | 6/2006 | Vasseur | ................ | H04L 45/00 709/232 |
| 2006/0143436 A1* | 6/2006 | Bird | ................ | H04L 63/08 713/151 |
| 2007/0002833 A1* | 1/2007 | Bajic | ................ | H04L 29/1282 370/352 |
| 2007/0156919 A1* | 7/2007 | Potti | ................ | G06F 8/67 709/238 |
| 2007/0268516 A1* | 11/2007 | Bugwadia | ................ | H04L 67/34 358/1.15 |
| 2007/0283042 A1* | 12/2007 | West | ................ | H04L 65/80 709/238 |
| 2008/0049755 A1* | 2/2008 | Gannon | ................ | H04L 41/082 370/395.1 |
| 2008/0162690 A1* | 7/2008 | Karagounis | ................ | H04L 12/66 709/224 |
| 2009/0252161 A1* | 10/2009 | Morris | ................ | H04L 45/124 370/389 |
| 2010/0180016 A1* | 7/2010 | Bugwadia | ................ | G06F 9/4411 709/220 |
| 2010/0217882 A1* | 8/2010 | Yang | ................ | H04L 12/4633 709/229 |
| 2011/0066488 A1* | 3/2011 | Ludewig | ................ | G06Q 30/00 705/14.43 |
| 2011/0295942 A1* | 12/2011 | Raghunath | ................ | H04L 45/00 709/203 |
| 2012/0317276 A1* | 12/2012 | Muniraju | ................ | H04L 41/14 709/224 |
| 2013/0054682 A1* | 2/2013 | Malik | ................ | H04W 4/001 709/203 |
| 2013/0073615 A1* | 3/2013 | Hall | ................ | H04L 67/306 709/203 |
| 2013/0159472 A1* | 6/2013 | Newton | ................ | H04L 67/2852 709/219 |
| 2013/0219482 A1* | 8/2013 | Brandt | ................ | H04L 65/607 726/9 |
| 2014/0185519 A1* | 7/2014 | Zhang | ................ | H04W 40/248 370/328 |
| 2014/0215019 A1* | 7/2014 | Ahrens | ................ | H04L 67/22 709/219 |
| 2014/0237138 A1* | 8/2014 | Xu | ................ | H04L 69/329 709/238 |
| 2014/0344326 A1* | 11/2014 | Kamath | ................ | H04L 67/1008 709/203 |
| 2014/0344425 A1* | 11/2014 | Varney | ................ | H04L 41/0813 709/221 |
| 2015/0006615 A1* | 1/2015 | Wainner | ................ | H04L 29/06047 709/203 |
| 2015/0082297 A1* | 3/2015 | Parry | ................ | G06F 8/65 717/173 |
| 2015/0121447 A1* | 4/2015 | Jiang | ................ | H04L 63/0263 726/1 |
| 2015/0201033 A1* | 7/2015 | Gupta | ................ | H04L 67/2842 709/213 |
| 2015/0304165 A1* | 10/2015 | Menezes | ................ | H04L 41/0813 709/221 |
| 2015/0334094 A1* | 11/2015 | Suresh | ................ | H04L 63/0471 713/153 |
| 2015/0341453 A1* | 11/2015 | Miller | ................ | H04W 4/206 709/204 |
| 2016/0028855 A1* | 1/2016 | Goyal | ................ | H04L 43/10 709/203 |

OTHER PUBLICATIONS

Wlkipedia, "Network address", 2018.*
Gurbani et al., "Representing Trunk Groups in tel/sip Uniform Resource Identifiers (URIs)", RFC 4904, 2007 (Year: 2007).*
Wikipedia, "Routing protocols and architectures/Content Delivery Networks", 2019 (Year: 2019).*
Dictionary.com, "desired", 2019 (Year: 2019).*
Merriam-Webster dictionary, "definite", 2020 (Year: 2020).*
Merriam-Webster dictionary, "preferred", 2020 (Year: 2020).*

* cited by examiner

CONTEXT-SENSITIVE TECHNIQUES FOR OPTIMIZING NETWORK CONNECTIVITY

BACKGROUND

The use of network computing and storage has proliferated in recent years. The resources for network computing and storage are often provided by computing resource providers who leverage large-scale networks of computers, servers and storage drives to enable clients, including content providers, online merchants and the like, to host and execute a variety of applications and web services. Content providers and online merchants, who traditionally used on-site servers and storage equipment to host their websites and store and stream content to their customers, often forego on-site hosting and storage and turn to using the resources of the computing resource providers. The usage of network computing allows content providers and online merchants, among others, to efficiently and to adaptively satisfy their computing needs, whereby the computing and storage resources used by the content providers and online merchants are added or removed from a large pool provided by a computing resource provider as need and depending on their needs.

However, network computing may rely on a large number of resources, many of which may have different performance characteristics, geographic location, security requirements, and the like, and a given destination of a network computing provider may be reached by several networks or network paths. A consumer of network computing services desiring to interact with such a destination may thus have difficulty determining which network or network path would provide an optimal connection, in terms of performance, stability, security, or some other criterion.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and methods for optimizing network connections between one or more client devices and one or more destinations, such as network destinations, by selecting an optimal interstitial network by which to connect the client devices and destinations. For example, a routing engine may be implemented to detect that a given client device requests a connection with a destination. The routing engine may determine, based on various attributes of the desired destination, the requesting client device, and/or the networks capable of connecting the client device and the destination, optimized parameters and routes for the network connection. Such optimization may involve the selection of an optimal network, the negotiation of an optimal connection type, and the like. The optimization, and therefore both the attributes and the factors considered when performing the optimization, may be on one or more disparate criteria, such as data security, bandwidth, network latency, geographical proximity, and the like.

The optimal configuration as determined by the routing engine may be processed by the client device (and/or, in some embodiments, by entities associated with the destination and/or the networks), so as to enable the client device to transact with the destination using optimized parameters. For example, a client device may be capable of remote management, such as by the use of mobile device management routines, and an optimal configuration may be provided to such routines for further processing by the client device. Thereafter, the client device may connect with the destination in the specified manner.

Figure 1:
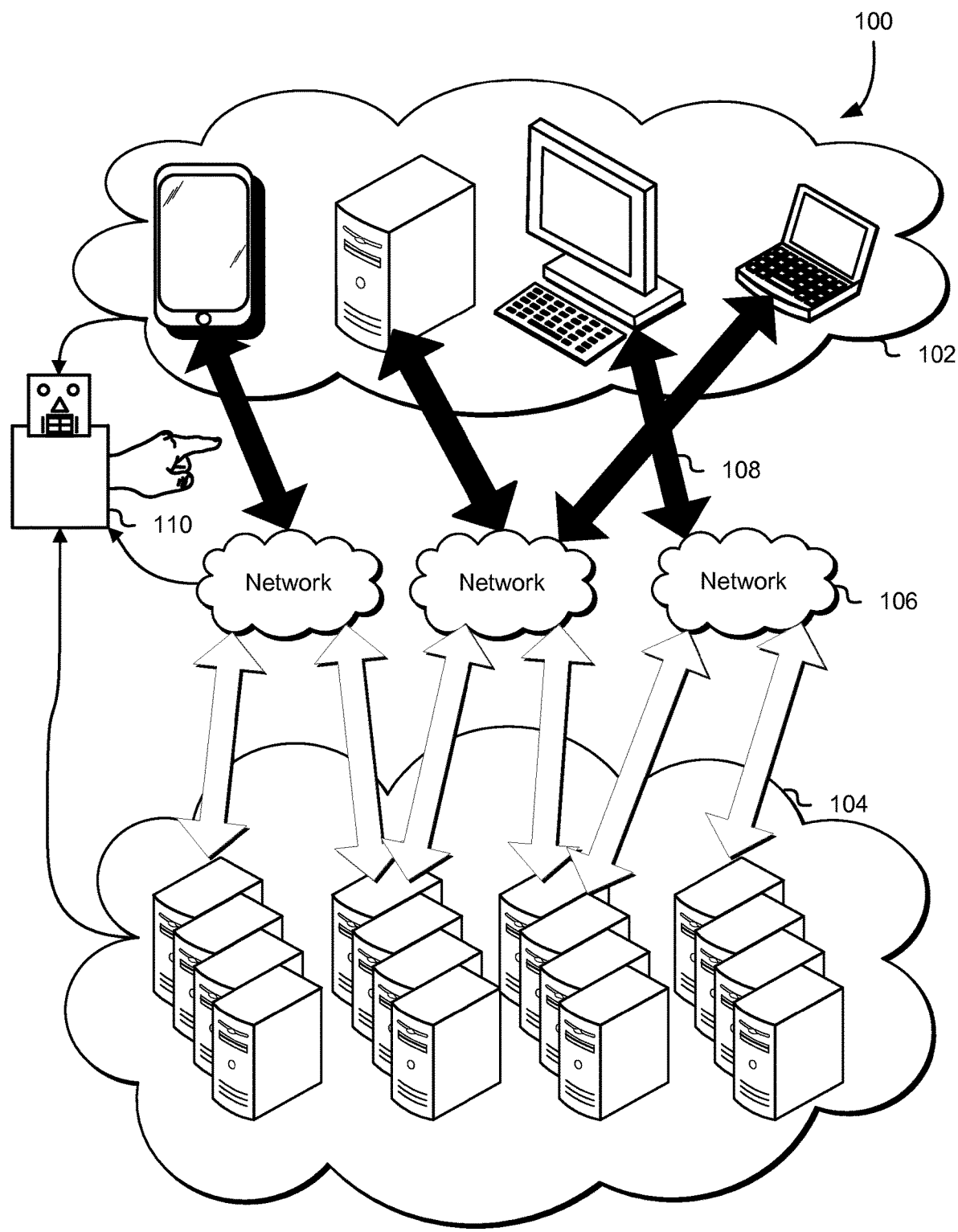
FIG. 1 schematically illustrates an example environment where various attributes of client devices, destinations, and/or network may be used to optimize network connections, in accordance with some embodiments.

FIG. 1 schematically illustrates an example environment where various attributes of client devices, destinations, and/or network may be used to optimize network connections, in accordance with some embodiments. One or more client devices 102 connect, request a connection with, or attempt to connect with one or more destinations 104 remote from the client devices 102, via one or more networks 106. As illustrated, some or all of the networks 106 may correspond to multiple destinations 104. Furthermore, some or all of the destinations 104 may be reached by multiple networks.

The client devices 102 may include any devices or entities capable of communicating, such as over a network 106, to a destination 104. For example, the client devices 102 may be physical devices, such as smartphones, laptops, tablets, servers, desktop computers, routers and/or other network appliances, and the like. As another example, client devices 102 may be virtual devices, such as virtual hosts provided by or in connection with a computing resource service provider, e.g., one or more computing resources via one or more services provided by the computing resource service provider.

The destinations 104 may be any resource reachable by the client devices 102, such as over a network 104. For example, destinations 104 may include physical servers, network appliances (such as routers), virtual hosts such as those provided by a computing resource service provider, services provided by a computing resource service provider, smartphones, laptops, tablets, servers, desktop computers, and the like.

The networks 106 may include any entity or collection of entities that connect(s) one computing entity, such as a client device 102, with at least one other entity, such as destinations 104, whether directly or indirectly. In some embodiments, the networks 106 may be interconnected, and/or multiple networks may be combined into a given network. The networks 106 may be physical (e.g., using wired or wireless communications, between physical entities, and the like), virtual (such as may be provided via a service of a computing resource service provider, e.g., virtual versions of various network endpoints and components), or some combination thereof, and may be implemented any technology or combination of technologies as may be relevant to a given implementation. The networks may be, or include, computing entities, such as proxy devices, network appliances, servers (such as hosts, whether virtual or physical), and the like. For example, the networks may include interconnections between a client device 102 and at least one destination 104, with one or more interstitial proxies or hosts between the client device 102 and the at least one destination 104. In this example, the techniques described herein may include the selection (such as by a routing engine 110, as described in more detail herein) of one or more of the interstitial proxies or hosts as, or as a part of, selecting an optimal network from amongst a plurality of networks.

Technologies implemented may relate to signaling protocols, network protocols (such as Internet protocols), cryptographic protocols, data security protocols, and the like, and may relate independently to each segment of the network and/or connection pair. The technologies used may relate to any network layer, as well, such as various layers of the Open Systems Interconnection model (OSI), which include application layers, presentation layers, session layers, transport layers, network layers, data link layers, and physical layers.

In connection with a connection request, e.g., by a client device 102 to a destination 104, a routing engine 110 may be implemented to assess various attributes of the destinations 104, the client devices 102, the networks 106, or some combination thereof, so as to determine the optimal configuration by which the client device 102 may connect to the requested destination 104. The routing engine 110 may be a separate entity from any of the client devices 102, networks 106, and/or destinations 104, or, in some embodiments, may be implemented in or as part of such components. In the case that the routing engine 110 is a separate entity, it may be implemented in a physical or virtual computing device, such as may be provided by a computing resource service provider.

The attributes assessed by the routing engine 110 may include any properties about the entity to which they relate. Such attributes may include performance characteristics, device type, security requirements, capacity (e.g., computing and/or storage capacity), geographic location (e.g., proximity to the remote entity), the nature of accessible data on a given entity, network characteristics (latency, bandwidth, stability, etc.) and the like. The routing engine 110 may use such information to select an optimal network from among the networks (e.g., routes, proxies or hosts) capable of connecting to a given requested destination. A network may be determined as optimal by virtue of one or more characteristics relevant to the connection, the client device, a customer utilizing the client device, the destination, a computing resource service provider implementing some or all of the aforementioned entities, or some combination thereof.

For example, an implementing computing resource service provider may instruct the routing engine 110 to optimize inbound connections to its destinations 104 by determining the network or set of networks 106 that results in the shortest physical distance of the network path between the requesting client device 102 and the requested destination 104. In this example, the routing engine may determine the geographic location of the destination 104, the geographic location of the client device 102, and the additional physical distance generated by each eligible network 106, so as to determine the network that provides the shortest overall physical distance between the client device and the destination.

As another example, a client device may request the highest security connection available to reach a certain quantum of data stored on one or more of the destinations 104. In response, the routing may determine the security capabilities of the client device, as well as the security capabilities of the destination(s) 104 having the requested quantum of data. Based on these determinations, the routing engine may compare the security capabilities of the destination(s) 104 and the client device 102, and further identify one or more networks 106 that allows for the highest level of network security between the endpoints given the respective security capabilities of the destination(s) 104 and the client device 102.

The examples provided immediately above are not limiting. The routing engine 110 may optimize for any parameter relevant to the client device 102, destination 104, network 106, or some combination thereof (or a user or administrator thereof), such as overall latency, system load balancing (e.g., amongst destinations and/or networks), user experience (e.g., responsive to the type of client device 102 requesting the connection), and so on. As previously mentioned, the routing engine 110 may optimize for such parameters by identifying and/or selecting one or more networks 106 by the characteristics of any component or combination of components thereof. For example, the routing engine 110 may, as previously discussed, select or identify one or more networks based on characteristics of interstitial proxies and/or hosts, and/or the potential effects on the parameters the selection thereof would cause.

At a time after the routing engine 110 determines an optimal configuration as discussed, the optimal configuration, or information relating to the determined optimal configuration, may be further processed by a relevant entity so as to configure the overall system in accordance therewith. In some embodiments, the optimal configuration is provided to a client entity 102 for further processing. For example, the optimal configuration is provided to the client entity 102 in, e.g., the form of a set of policies enforceable by remote management routines resident on the client device. Examples of such remote management routines include mobile device management (MDM) capabilities. In this example, once the optimal configuration is processed by the client device 102, the client device may proceed with connecting to the remote destination 104 via, e.g., the optimal network 106 as determined by the routing engine 110, as it would then be configured to do so.

In some embodiments, the destinations 104 themselves may be configured to instruct a given client device within, e.g., a given session, to further connect to the destination 104 via the determined optimal network 106, after an initial connection therewith by an optimization-agnostic network or component thereof. For example, a client device 102 may initiate a session with a destination 104 via a first network 106 (e.g., with which it may have previously connected). A routing engine 110 may determine that, based on the attributes of the destination 104, the client device 102, and/or the networks 106, a different network 106 may provide a more optimal connection and/or experience. As a result, the routing engine 110 may cause the destination 104, and/or the first network 106, to redirect or instruct the client device 102 to use the different network 106 for further and/or future connection, in accordance with the optimization performed.

In some embodiments, the routing engine 110 may also determine the optimal connection type, e.g., between the client device 102 and a network 106, and/or between the network 106 and the destination 104, in a similar fashion as described above for determining the optimal network 106. For example, the routing engine 110 may assess attributes of the client device 102 and/or the network 106 (either before or after an optimal network 106 is determined), and determine an optimal connection type based on the assessed attributes. As a further example, if both the client device 102 and the (e.g., optimal) network 106 both support Transport Layer Security/Secure Socket Layer (TLS/SSL), the routing engine 110 may determine that a connection secured using TLS/SSL would be an optimal connection type. Other types of optimizations, such as for network latency, processing overhead, data security, cryptographic capabilities, and the like, are contemplated herewith, and it is contemplated that an optimized connection type may be relevant not just between the two immediate endpoints (e.g., between a client device 102 and a network 106), but also downstream or upstream (e.g., at the destination 104). In some embodiments, the routing engine 110 may take such downstream and/or upstream effects in consideration when making the determinations detailed herein.

Figure 2:
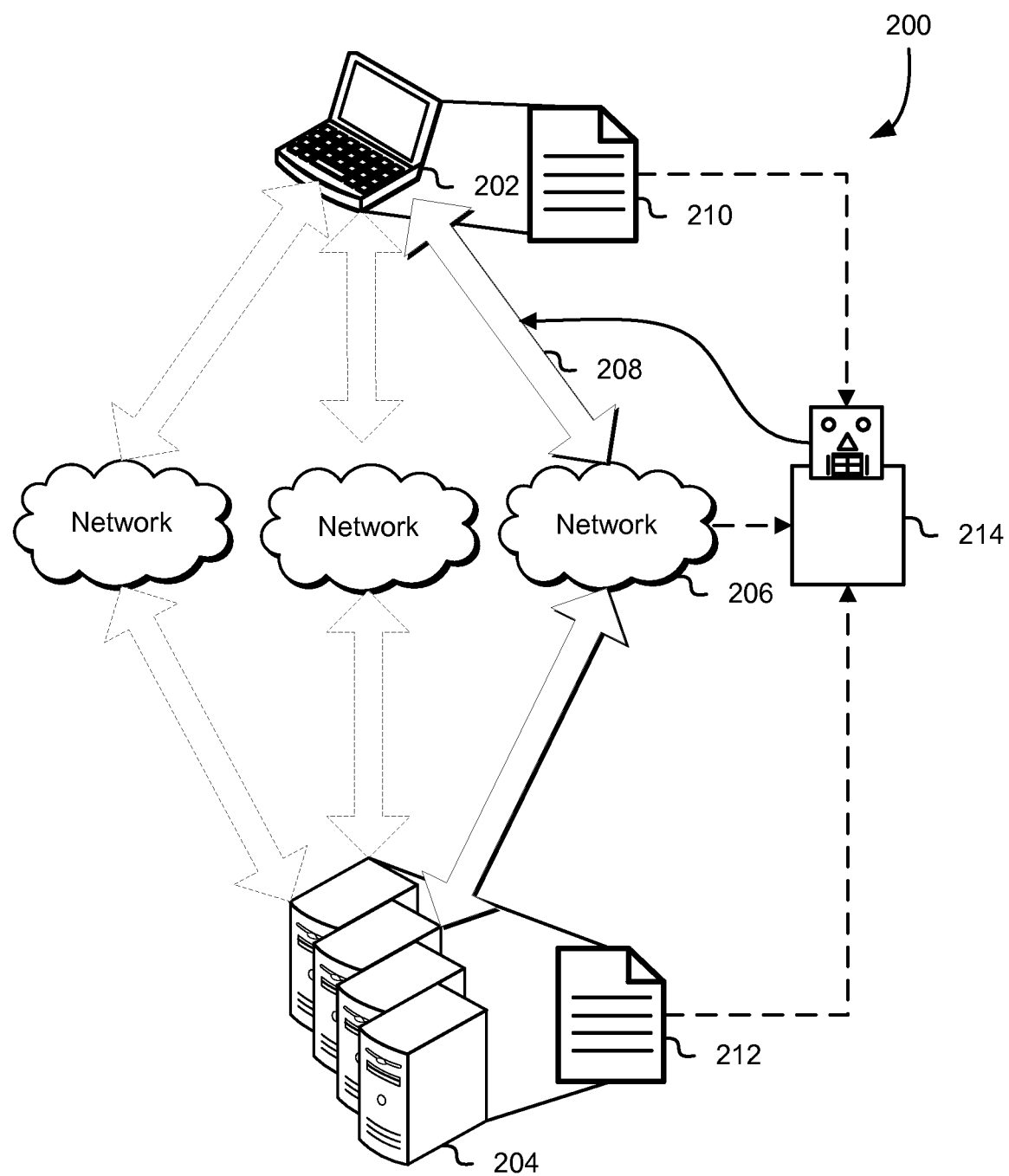
FIG. 2 schematically illustrates an example environment in which a routing engine determines one or more optimal networks by which a client device may connect to a destination, in accordance with some embodiments.

FIG. 2 schematically illustrates an example environment in which a routing engine determines one or more optimal networks by which a client device may connect to a destination, in accordance with some embodiments. A client device 202, which may in some embodiments be similar to client device 102 described in connection with FIG. 1, connects, requests a connection with, or attempts to connect with one or more destinations 204 remote from the client device 202, via one or more networks 206. For clarity of illustration, multiple networks 206 are shown as connected to, or capable of connecting to, destination 204. However, as previously discussed in connection with FIG. 1, some or all of the networks 206 may correspond to multiple destinations 204. The networks 206 and the destination 204 may, in some embodiments, be similar to the networks 106 and the destinations 104 described above in connection with FIG. 1.

The client devices 102 may include any devices or entities capable of communicating, such as over a network 106, to a destination 104. For example, the client devices 102 may be physical devices, such as smartphones, laptops, tablets, servers, desktop computers, routers and/or other network appliances, and the like. As another example, client devices 102 may be virtual devices, such as virtual hosts provided by or in connection with a computing resource service provider, e.g., one or more computing resources via one or more services provided by the computing resource service provider.

As previously discussed, in connection with a connection request, e.g., by a client device 202 to a destination 204, a routing engine 214 may be implemented to assess various attributes 212 of the destinations 204, attributes 210 of the client devices 102, attributes of the networks 206, or some combination thereof, so as to determine the optimal configuration by which the client device 202 may connect to the requested destination 204. The routing engine 214 may be similar in functionality and implementation to the routing engine 110 discussed above in connection with FIG. 1.

The attributes assessed by the routing engine 214 may include any properties about the entity to which they relate. As mentioned above, such attributes may include performance characteristics, device type, security requirements, capacity (e.g., computing and/or storage capacity), geographic location (e.g., proximity to the remote entity), the nature of accessible data on a given entity, network characteristics (latency, bandwidth, stability, etc.) and the like. The attributes may be pushed to the routing engine 214, e.g., at some interval, provided to the routing engine 214 in connection with a request for such attributes by the routing engine 214, and/or, in some embodiments, may be extracted from existing communications by the destinations 204 and/or client devices 202 by e.g., a listener implemented by the routing engine 214. In some embodiments, the attributes may be provided as metadata.

The routing engine 214 may use such information to determine an optimal configuration for client device 202 to connect with destination 204. The optimal configuration may include the identification of an optimal network 206 (illustrated as a solid arrow) from among the networks capable of connecting to a given requested destination. As previously discussed, a network may be determined as optimal by virtue of one or more characteristics relevant to the connection, the client device, a customer utilizing the client device, the destination, a computing resource service provider implementing some or all of the aforementioned entities, various characteristics of an interstitial host or proxy comprising or part of the networks, or some combination thereof.

In addition to the examples provided above in connection with FIG. 1, by way of further example, an implementing computing resource service provider may instruct the routing engine 214 to optimize inbound connections to its destinations 204 by providing requesting client devices 202 access to the destination 204 by way of a network 206 that is geographically nearest to the client device 202, so as to, e.g., minimize network latency and/or maximize reliability of the connection portion between the client device 202 and the networks 206 (e.g., the so-called "last mile"). In such an example, as may be contemplated, a highly determinative attribute may be the geographical location of the client device, as well as that of the network, and such information may be requested by (or pushed to, as previously discussed) the routing engine 214. Furthermore, the downstream effects of the selection of a given network, e.g., with regard to the geographical location of the destination, may be contemplated by the routing engine 214, and the routing engine 214 may also take relevant attributes of the destination into account when making its determination.

As previously mentioned, the examples provided herein are not limiting, and it is contemplated that the routing engine 214 may optimize for any parameter relevant to the client device 202, destination 204, network(s) 206, or some combination thereof (or a user or administrator thereof), such as overall latency, system load balancing (e.g., amongst destinations and/or networks), user experience (e.g., responsive to the type of client device 202 requesting the connection), and so on.

At a time after the routing engine 214 determines an optimal configuration as discussed, the optimal configuration, or information relating to the determined optimal configuration, may be further processed by a relevant entity so as to configure the overall system (or components thereof) in accordance therewith. As previously mentioned, the routing engine 214 may pass the determined optimal configuration to the client device 202, e.g., via remote management routines, so as to cause the client device to connect with, e.g., a designated optimal network 206 when attempting to reach the destination 204. As a further example, existing static routes between networks 206 and the destination 204 may be utilized, and an optimum static route/network/destination combination selected, from those static routes extant in the configuration at the time the routing engine 214 makes its determination.

In some embodiments, the routing engine 214 may cause, e.g., a service or other capability of an implementing computing resource service provider, to reconfigure networks 206 and/or reroute connections between existing networks 206 to the destination 204 in accordance with the determined optimal configuration. For example, routes within/between the networks 206 and the destination 204 may be reconfigured by, e.g., an implementing computing resource service provider, according to an optimal configuration as determined by the routing engine 214. In such an example, a given network 206 may serve as an access point to the client device 202 in order to reach the destination 204, but in connection with the client device 202 connecting with such a network, the routing engine 214 may cause the reconfiguration of routes between the network 206 and the destination 204 in a manner that may be transparent to the connecting client device 202.

As previously mentioned, in some embodiments, the destinations 204 may be configured to instruct a given client device within, e.g., a given session, to further connect to the destination 204 via the determined optimal network 206, after an initial connection therewith by an optimization-agnostic network or component thereof. For example, a client device 202 may initiate a session with a destination 204 via a first network(s) (e.g., with which it may have previously connected, illustrated by the dashed arrows). A routing engine 110 may determine that, based on the attributes 212 of the destination 204, the attributes 210 of the client device 202, and/or the networks 206, a different network 206 may provide a more optimal connection and/or experience. As a result, the routing engine 214 may cause the destination 204, and/or the first network 206, to redirect or instruct the client device 202 to use the different network 206 for further and/or future connection, in accordance with the optimization performed.

In some embodiments, the client device 202 may, prior to submitting a connection request (e.g., for connecting to the destination 204), issue a configuration request, directly or indirectly, to the routing engine 214. Such a configuration request may be issues by, e.g., remote management routines accessible to the client device, and may be made in connection with (and/or separately from) an ensuing connection request. In some embodiments, the configuration request may be issued by some other entity of a computing resource service provider receiving a connection request from a client device 202.

In some embodiments, the routing engine 214 may also determine the optimal connection type 208, e.g., between the client device 202 and a network 206, and/or between the network 206 and the destination 204, in a similar fashion as described above for determining the optimal network 206. Such determination of the optimal connection type 208 may be part of the overall optimal configuration determined by the routing engine 214. For example, the routing engine 214 may assess attributes of the client device 202 and/or the network 206 (either before or after an optimal network 106 is determined), and determine an optimal connection type based on the assessed attributes.

As a further example, if both the client device 202 and the (e.g., optimal) network 206 both support Transport Layer Security/Secure Socket Layer (TLS/SSL), the routing engine 214 may determine that a connection secured using TLS/SSL would be an optimal connection type to be applied to a connection 208 between the client device 202 and the network 206. As previously mentioned, other types of optimizations, such as for network latency, processing overhead, data security, cryptographic capabilities, and the like, are contemplated herewith, and it is further contemplated that an optimized connection type may be relevant not just between the two immediate endpoints (e.g., between a client device 202 and a network 206), but also downstream or upstream (e.g., at the destination 204). In some embodiments, the routing engine 214 may take such downstream and/or upstream effects in consideration when making the determinations detailed herein.

Figure 3:
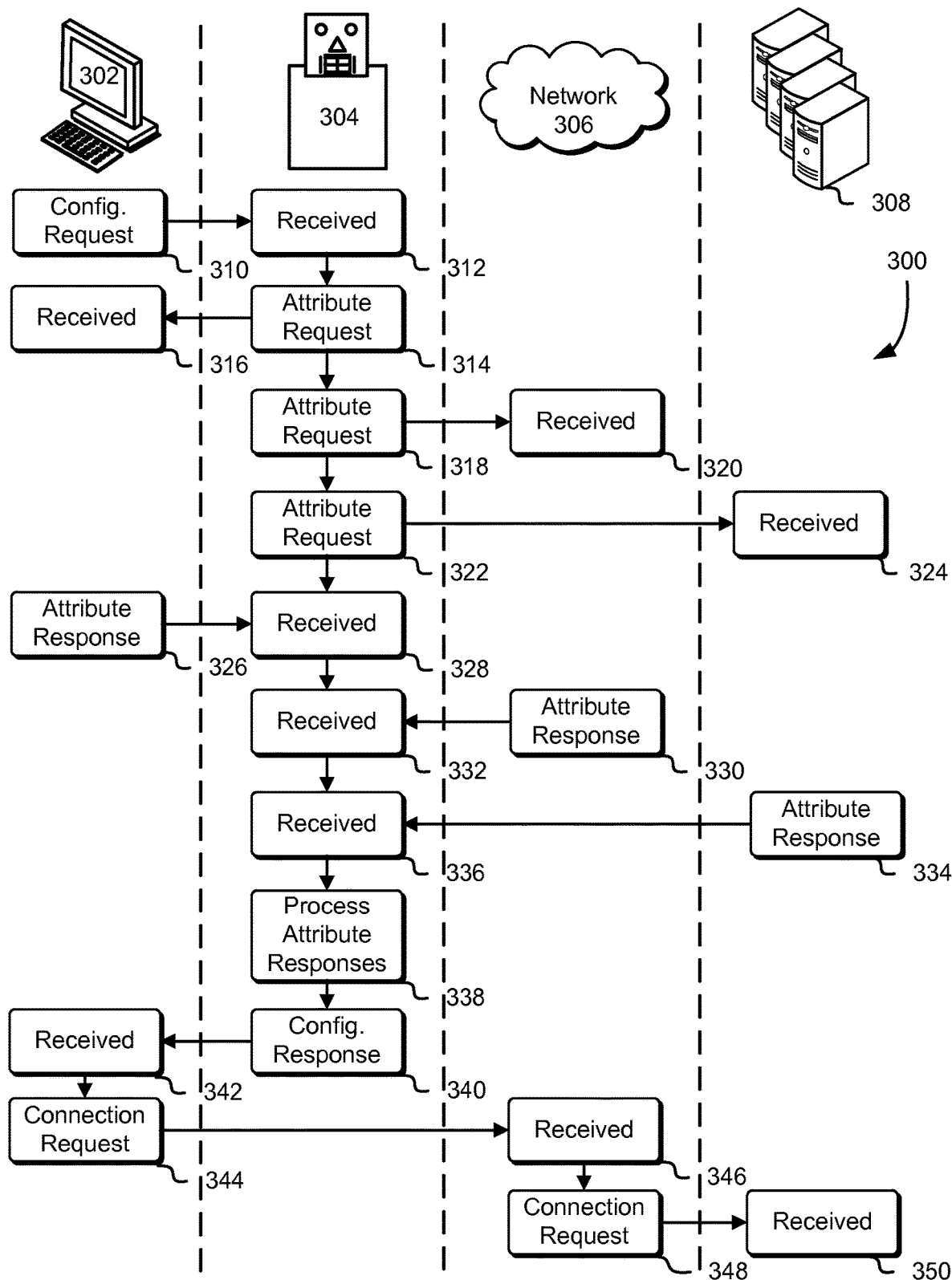
FIG. 3 schematically illustrates an example data flow between client devices, routing engines, networks, and destinations in accordance with some embodiments.

FIG. 3 schematically illustrates an example data flow between client devices 302, routing engines 304, networks 306, and destinations 308 in accordance with some embodiments. The client devices 302, routing engines 304, networks 306, and destinations 308 may be similar to such components as described above in connection with FIGS. 1 and 2. While FIG. 3 illustrates a linear data flow, it is contemplated that many of the processing steps and transitions described herein may not necessarily occur in the order illustrated, and some of such processing steps and transitions may occur asynchronously, synchronously, or contemporaneously with one or more other processing steps and/or transitions, as well as in any order. Other data flows differing than the one illustrated are also contemplated and examples are mentioned above in connection with FIGS. 1 and 2.

In some embodiments, a configuration request 310 is submitted by a client device 302 and received 312, directly or indirectly, by a routing engine 304. In response, a routing engine 304 submits attribute requests 314, 318, 322, which are received 316, 320, 324, by client device 302, network 306, and destination 308, respectively. At a time after receipt 316, 320, 324, attribute responses 326, 330, 334, are provided by the client device 302, network 306, and destination 308, respectively, and received 328, 332, 336, by the routing engine 304. Attributes may be similar to those discussed above in connection with at least FIGS. 1 and 2.

At a time after the attribute responses are received from the client device 302, network 306, and destinations 308, the routing engine 304 processes 338 the attribute responses to generate an optimal configuration 340, which may include information identifying the optimal network 306 and/or connection type(s), and provides the optimal configuration 340 as a response to the configuration request 310. At a time after receipt 342, the client device 302 may, such as described in further detail above, be configured to connect in accordance with the optimal configuration provided by the routing engine 304. Connection requests 344 by the client device 302 may then be sent to the identified optimal network 306 which, upon receipt 346, further communicates the connection request 348 to the desired destination 350.

As previously discussed, it is contemplated that the configuration requests may be initiated by other entities, such as by those of a computing resource service provider, rather than the client device. Additionally, also as previously discussed, the connection request may occur in a fashion temporally decoupled from that of the configuration request, in a different order than illustrated in FIG. 3, and the like. Furthermore, in some embodiments, data by the client device 302 may be replicated on multiple destinations, adding a further determination in connection with the processing of the attribute responses 338 of which destination 308 would be optimal with regard to the connection request.

Figure 4:
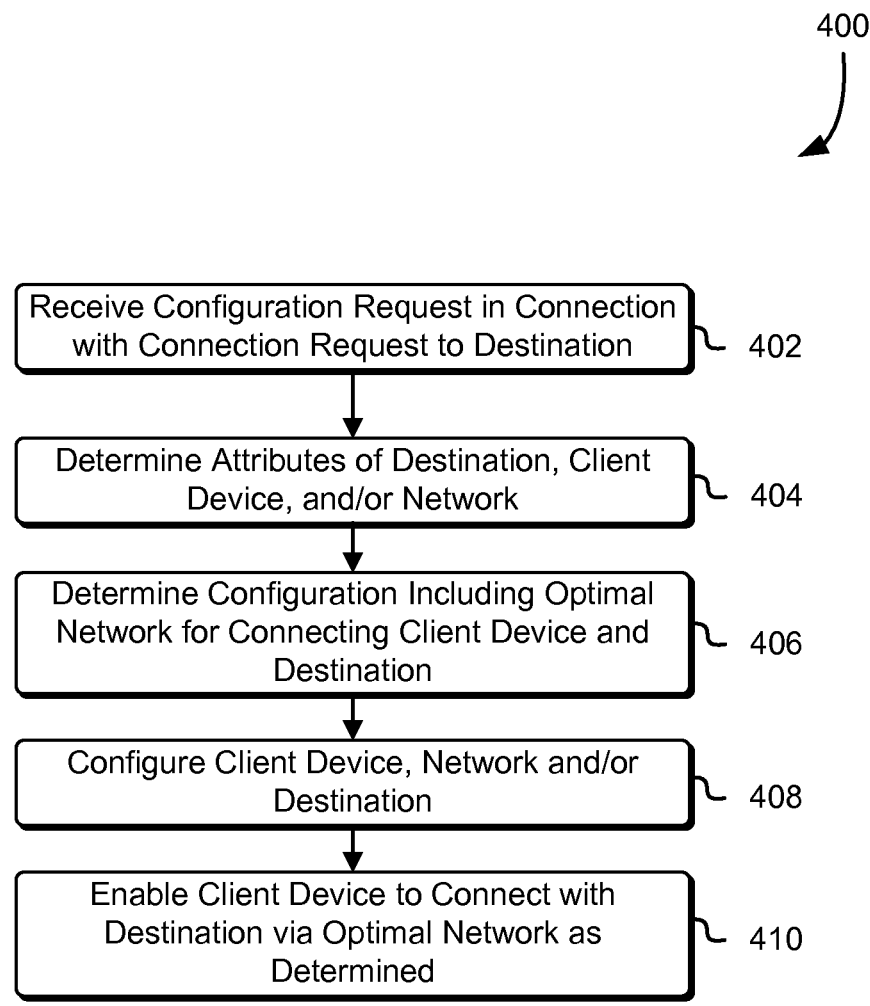
FIG. 4 schematically illustrates an example process for processing configuration and connection requests to enable a client device to connect with a destination using an optimal network, in accordance with some embodiments.

FIG. 4 schematically illustrates an example process for processing configuration and connection requests to enable a client device to connect with a destination using an optimal network, in accordance with some embodiments. At step 402, an entity, such as a routing engine as described above in connection with at least FIGS. 1 and 2, receives a configuration request in connection with a connection request, such as by a client device as described above in connection with FIGS. 1 and 2. At step 404, an entity, such as a routing engine, determines one or more attributes of the destination, client device, and/or applicable networks to connect the destination and client device. As previously discussed, such attributes may be provided by the entities to which they pertain, or the, e.g., routing engine, may retrieve such information (e.g., submit an attribute request to the entities).

At step 406, after determining the attributes in step 404, the, e.g., routing engine processes the information received and determines an optimal configuration, which may include the identification of an optimal network for connecting the client device and/or destination. As previously discussed, the determination may be performed by the routing engine relative to any relevant optimization criterion, some examples of which were discussed above in connection with at least FIGS. 1 and 2.

At a time after determining the optimal configuration in step 406, the routing entity causes one or more of the client device, network, and/or destination to be configured in accordance with the optimal configuration at step 408. As previously discussed, the entity to be configured may depend on the particular implementation, e.g., if the client device has access to remote management routines, and/or if the networks and/or the routes between the networks and the destinations are static or dynamically configurable (e.g., by an implementing computing resource service provider).

At step 410, after the relevant entities are configured according to the optimal configuration generated in step 406 and provided in step 408, the client device is enabled to connect with the destination via the optimal network as determined by the routing engine, and in accordance with the attributes of the relevant entities as determined in step 404.

Figure 5:
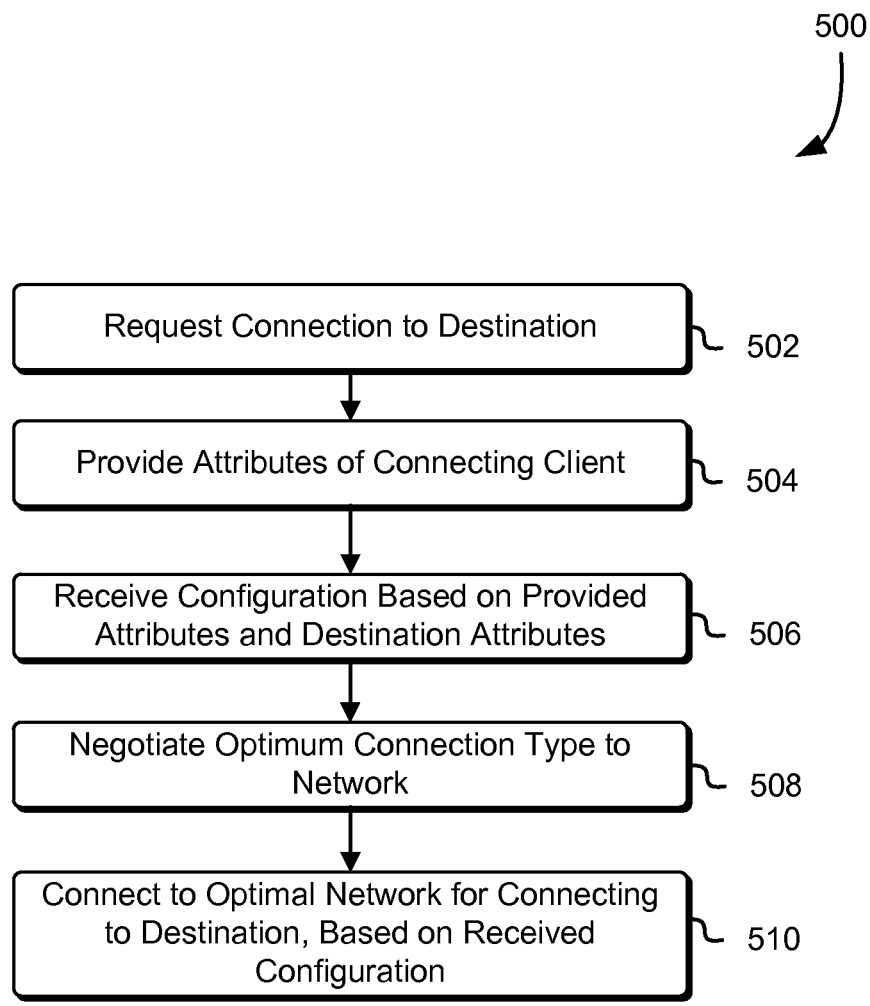
FIG. 5 schematically illustrates an example process for connecting and optimizing with a remote destination using various attributes, in accordance with some embodiments.

FIG. 5 schematically illustrates an example process for connecting and optimizing with a remote destination using various attributes, in accordance with some embodiments. At step 502, an entity, such as a client device as previously described in connection with at least FIGS. 1-4, requests a connection a destination, such as the destinations described above in connection with at least FIGS. 1-4. The client device may, in some embodiments, be configured with remote management routines, such as mobile device management capabilities, and the destinations may be remote to the client device and in an arbitrary geographical location not necessarily known to the client device.

At step 504, attributes of the connecting entity (e.g., the client device) are provided by that entity, either asynchronously or synchronously in connection to, e.g., an attribute request from a routing engine. Such attributes may include any relevant information relating to the client device, some examples of which are provided in further detail above. For example, the connecting entity may provide information as to which of the available networks it prefers to connect to the destination, as well as its preferred connection type.

At step 506, an optimal configuration is received by, e.g., the client device, from, e.g., a routing engine, in accordance with the attributes provided at step 504, attributes of the desired destination, applicable networks available to connect the two entities, policies set by an implementing computing resource service provider, requirements of the client device, and the like. Such an optimal configuration may be similar in nature to that which is described above in connection with at least FIGS. 1-4. In some embodiments, as previously discussed, the optimal configuration may be implemented by using remote management routines on the client device and available to the "pushing" entity, e.g., the routing engine (whether directly or indirectly). The optimal configuration may be generated according to one or more techniques described above in connection with at least FIGS. 1-3, and, in some embodiments, using the process described above in connection with FIG. 4.

At step 508, an entity, such as a client device, may negotiate an optimal connection type with which to connect to a network that in turn connects the client device to the destination. Such a negotiated optimal connection type may be a part of an optimal configuration as determined by, e.g., a routing engine as previously described.

At step 510, the entity (e.g., client device) may then proceed to connect with the desired destination, via the optimal network designated by the received optimal configuration, and in some embodiments, using the optimal connection type designated by the optimal configuration (or prior to the generation of the optimal configuration).

Figure 6:
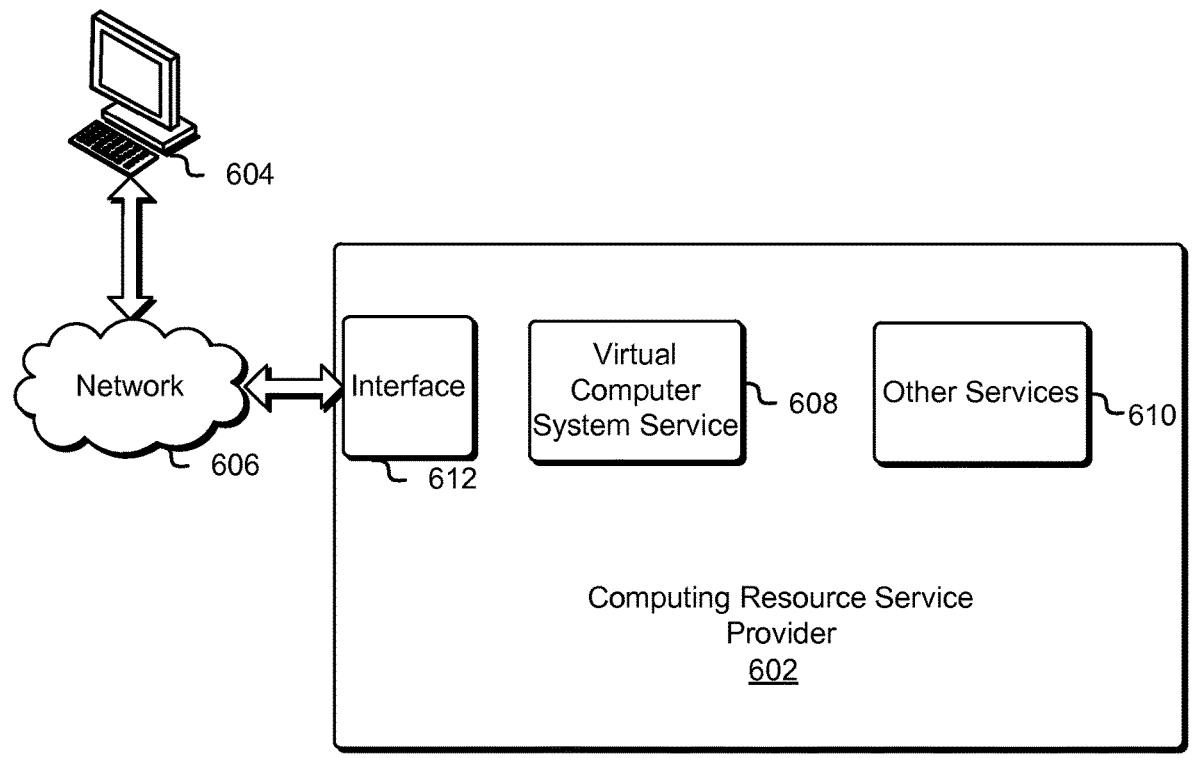
FIG. 6 shows an example of a customer connected to a computing resource service provider in accordance with at least one embodiment.

FIG. 6 shows an example of a customer connected to a computing resource service provider in accordance with at least one embodiment. The computing resource service provider 602 may provide a variety of services to the customer 604 and the customer 604 may communicate with the computing resource service provider 602 via an interface 612, which may be a web services interface or any other type of customer interface. While FIG. 6 shows one interface 612 for the services of the computing resource service provider 602, each service may have its own interface and, generally, subsets of the services may have corresponding interfaces in addition to or as an alternative to the interface 612.

The customer 604 may be an organization that may utilize one or more of the services provided by the computing resource service provider 602 to maintain and deliver information to its employees, which may be located in various geographical locations. Additionally, the customer 604 may be an individual that utilizes the services of the computing resource service provider 602 to deliver content to a working group located remotely. As shown in FIG. 6, the customer 604 may communicate with the computing resource service provider 602 through a network 606, whereby the network 606 may be a communication network, such as the Internet, an intranet or an Internet service provider (ISP) network. Some communications from the customer 604 to the computing resource service provider 602 may cause the computing resource service provider 602 to operate in accordance with one or more embodiments described or a variation thereof.

The computing resource service provider 602 may provide various computing resource services to its customers. The services provided by the computing resource service provider 602, in this example, include a virtual computer system service 608 and one or more other services 610. It is noted that not all embodiments described include the services 608-610 described with reference to FIG. 6 and additional services may be provided in addition to or as an alternative to services explicitly described. As described, each of the services 608-610 may include one or more web service interfaces that enable the customer 604 to submit appropriately configured API calls to the various services through web service requests. In addition, each of the services may include one or more service interfaces that enable the services to access each other.

The virtual computer system service 608 may be a collection of computing resources configured to instantiate virtual machine instances on behalf of the customer 604. The customer 604 may interact with the virtual computer system service 608 (via appropriately configured and authenticated API calls) to provision and operate virtual computer systems that are instantiated on physical computing devices hosted and operated by the computing resource service provider 602. The virtual computer systems may be used for various purposes, such as to operate as servers supporting a website, to operate business applications or, generally, to serve as computing power for the customer. Other applications for the virtual computer systems may be to support database applications, electronic commerce applications, business applications, and/or other applications. Although the virtual computer system service 608 is shown in FIG. 6, any other computer system or computer system service may be utilized in the computing resource service provider 602, such as a computer system or computer system service that does not employ virtualization or instantiation and instead provisions computing resources on dedicated or shared computers/servers and/or other physical devices.

The computing resource service provider 602 additionally maintains one or more other services 610 based at least in part on the needs of its customers 604. For instance, the computing resource service provider 602 may maintain a database service for its customers 604. A database service may be a collection of computing resources that collectively operate to run one or more databases for one or more customers 604. The customer 604 may operate and manage a database from the database service by utilizing appropriately configured API calls. This, in turn, may allow a customer 604 to maintain and potentially scale the operations in the database.

Figure 7:
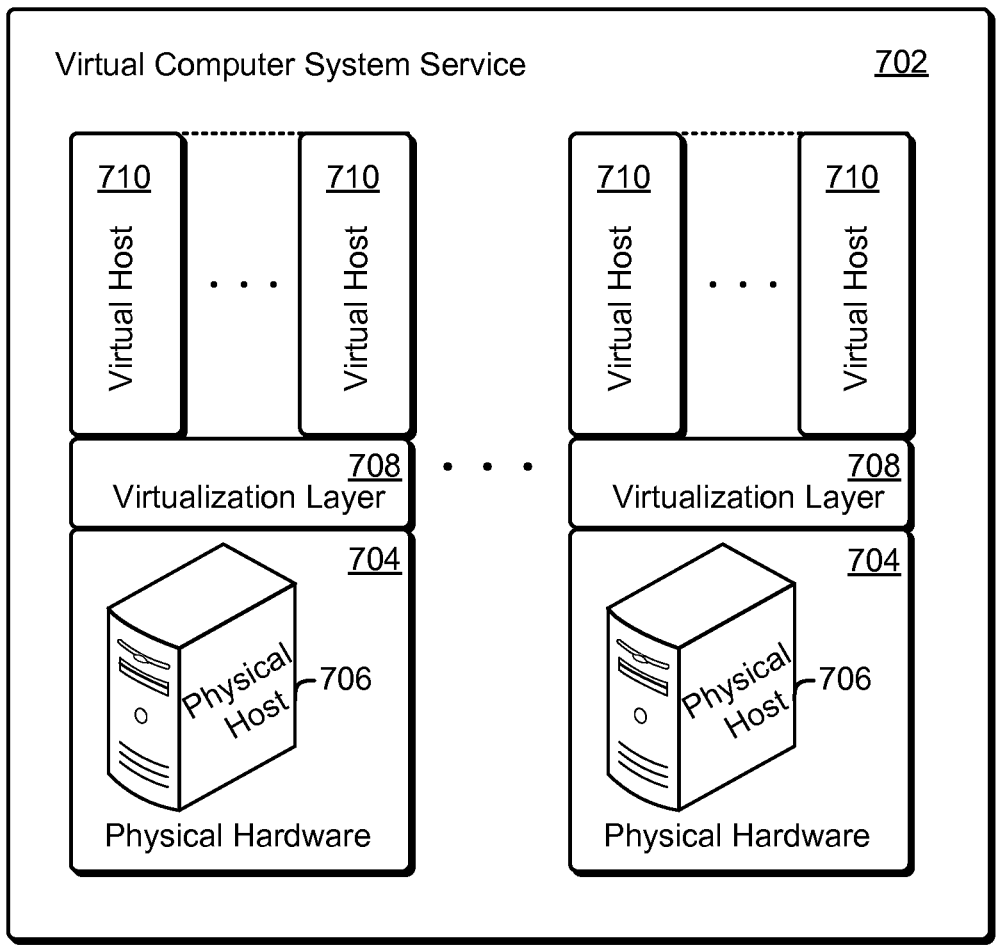
FIG. 7 illustrates a virtual computer system service in accordance with at least one embodiment.

FIG. 7 illustrates a virtual computer system service in accordance with at least one embodiment. The virtual computer system service 700, which may be physical hardware 704, is used by a computing resource service provider for providing computation resources for customers. The physical hardware 704 may include physical hosts $706_{1-m}$. The physical hosts $706_{1-m}$, may be any device or equipment configured to execute instructions for performing data computation, manipulation, or storage tasks, such as a computer or a server. A physical host 706 may be equipped with any needed processing capability including one or more processors, such as a central processing unit (CPU), a graphics processing unit (GPU) or a digital signal processor (DSP), memory, including static and dynamic memory, buses, and input and output ports that are compliant with any handshaking, communications or data transfer protocol. The physical hardware 404 may also include storage devices, such as storage disks and tapes, networking equipment and the like.

A virtualization layer 708 in the computing resources service provider enables the physical hardware 704 to be used to provide computational resources upon which one or more virtual hosts 710 may operate. The virtualization layer 708 may be any device, software, or firmware used for providing a virtual computing platform for the virtual hosts 710. The virtual computing platform may include various virtual computer components, such as one or more virtual CPUs, virtual memory and the like. The virtual hosts 710 may be provided to the customers of the computing service resource provider and the customers may run an operating system or an application on the virtual host 710. Further, the computing service resource provider may use one or more of its own virtual hosts 710 for executing its applications. Examples of the virtualization layer 708 include a hypervisor.

The virtualization layers 708 may provide a host activity report associated with the physical hardware 704, one or more physical hosts $706_{-m}$ or the one or more virtual hosts 710. The host activity report may include utilization, activity or operational information or statistics for the physical hardware 704, physical hosts $706_{-m}$, virtual hosts 710 or applications that are executed on the physical hosts $706_{-m}$ or the virtual hosts 710. The information included in the host activity report may be gathered or compiled over an interval of time or taken at one or more snapshots in time.

Figure 8:
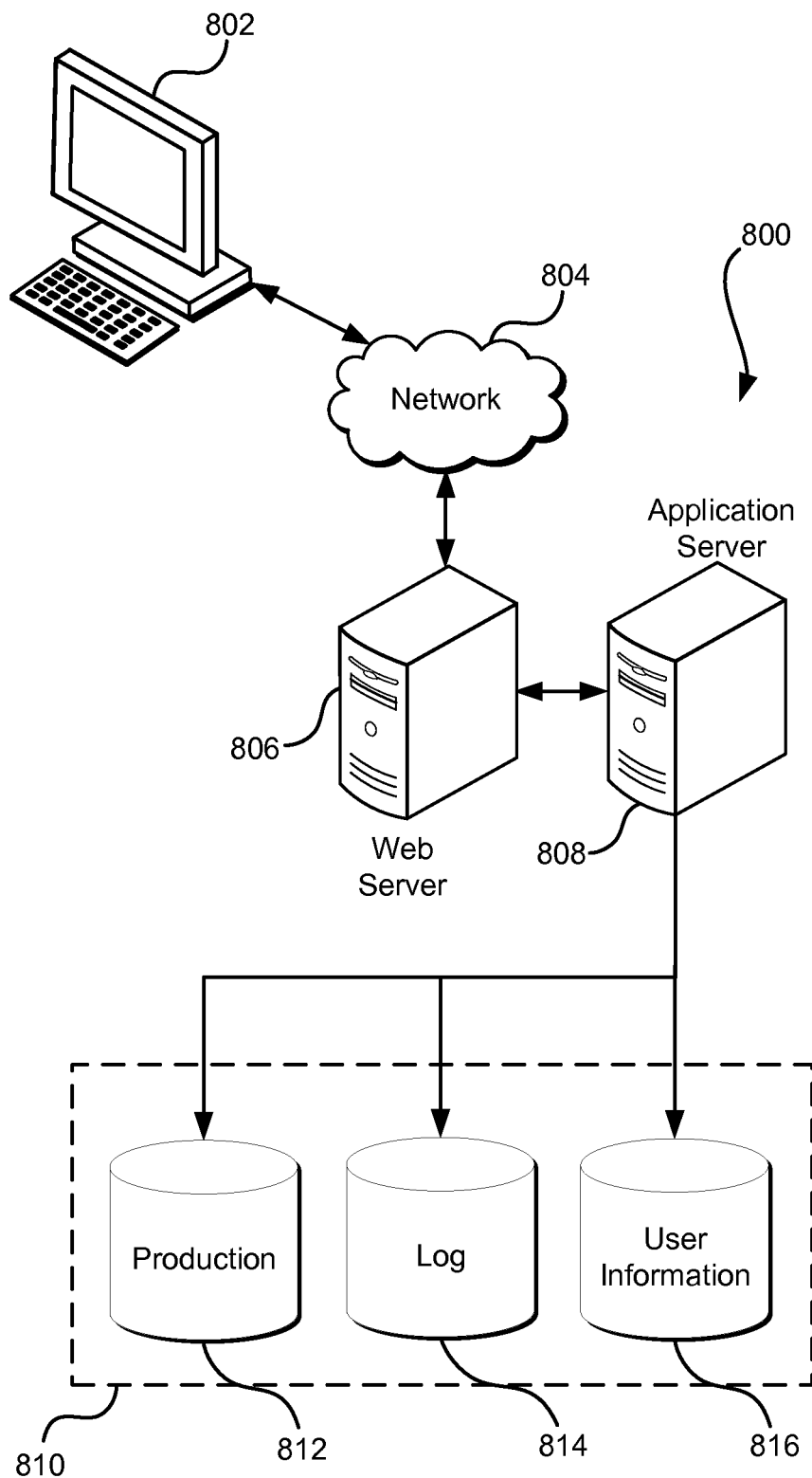
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C # or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
receiving, in connection with a connection request by a client device to reach a destination, a response, from a client device, to an attribute request, the response specifying at least a preferred network and a preferred connection type for a connection associated with the connection request;
in response to the connection request and the response, at least:
determining a connection type by which the client device connects with a subset of a plurality of networks connected to the destination based on the preferred connection type; and
determining a configuration, the configuration including a designation of a pre-existing static route from an identified network of the plurality of networks, that satisfies the preferred network, to the destination, for connecting the client device with the destination, by at least processing:
a first set of attributes of the client device;
a second set of attributes of the destination; and
the preferred network and the determined connection type for the connection to identify the identified network of the plurality of networks that satisfies the preferred network; and
in response to the connection request, configuring the client device to connect to the destination via the identified network in accordance with the configuration.

2. The computer-implemented method of claim 1, wherein determining the configuration is further based on security-related requirements specified in the connection request.

3. The computer-implemented method of claim 1, wherein at least one set of the plurality of networks is located in a different geographical location than a second set of the plurality of networks.

4. The computer-implemented method of claim 1, wherein the identified network is identified such that the pre-existing static route of the configuration provides a lowest latency connection between the client device and the destination relative to other pre-existing static routes between the client device and the destination.

5. The computer-implemented method of claim 1, wherein the at least one desired network connection selection criteria includes a network latency or a network bandwidth.

6. A system, comprising:
at least one computing device that implements one or more services to at least:
in connection with a connection request by a client device to reach a destination, wherein the connection request specifies at least one network connection selection criteria, the network connection selection criteria indicating a request for a preferred network or a preferred connection type for a network configuration, generate the configuration that includes an identification, of a network among one or more networks that satisfies the-at least one network connection selection criteria for a connection associated with the connection request by processing:
a first set of information relating to the client device;
a second set of information relating to the destination, wherein the second set of information satisfies at least one connection selection criteria; and
a third set of information relating to the one or more networks capable of connecting the client device to the destination; and
cause the client device to be configured, in response to the connection request, with the generated configuration.

7. The system of claim 6, wherein the one or more services further configure the client device by causing the client device to process the configuration with remote management routines resident on the client device.

8. The system of claim 6, wherein the one or more services further process at least the first set of information to determine a connection type that satisfies the preferred connection type between the client device and the network.

9. The system of claim 8, wherein the connection type is a session layer connection type.

10. The system of claim 6, wherein the one or more services further generate a configuration request in connection with the connection request so as to cause the services to generate the configuration.

11. The system of claim 6, wherein the at least one network connection selection criteria is associated with downstream effects by the network on the connection with the destination.

12. The system of claim 10, wherein the network is geographically closer to the client device than at least one other network among the one or more networks.

13. The system of claim 6, wherein:
the first set of information includes attributes of the client device, and
the second set of information includes attributes of the destination.

14. A non-transitory computer-readable storage medium having stored thereon executable instructions that, upon execution by one or more hardware processors of a computer system, cause the computer system to:
in connection with a connection request to connect with a destination, wherein the connection request is associated with at least one network connection selection criteria for a network configuration, wherein the network connection selection criteria comprises a security requirement for the connection associated with the connection request, determine the configuration by processing information relating to:
at least one first attribute of the destination;
at least one second attribute of a plurality of networks capable of connecting to the destination, wherein the at least one second attribute includes the at least one network connection selection criteria for the connection associated with the connection request so as to identify a network that satisfies the at least one network connection selection criteria from among a plurality of networks capable of connecting to the destination; and
at least one third attribute relating to the computer system; and
apply the configuration associated with the connection request so as to connect with the destination via the network.

15. The non-transitory computer-readable storage medium of claim 14, wherein:
the at least one second attribute includes network latency to the destination; and
the network connection selection criteria further comprises a preference for a low network latency imparted by the network when used to connect with the destination.

16. The non-transitory computer-readable storage medium of claim 14, wherein the instructions further comprise instructions that, upon execution by the one or more processors, cause the computer system to process the information using a first entity separate from a second entity providing the connection request.

17. The non-transitory computer-readable storage medium of claim 14, wherein the instructions further comprise instructions that, when executed by the one or more processors, apply the configuration by at least processing the configuration using mobile device management routines accessible to an entity providing the connection request.

18. The non-transitory computer-readable storage medium of claim 14, wherein the instructions further comprise instructions that determine the configuration so as to identify the network based at least in part on geographical location of the destination.

19. The non-transitory computer-readable storage medium of claim 14, wherein the at least one first attribute is selected from the group consisting of network latency, bandwidth, geographical proximity, and data security protocol supported by the destination.

20. The non-transitory computer-readable storage medium of claim 14, wherein the instructions further comprise instructions that, upon execution by the one or more processors, determine the configuration by processing information relating to at least one attribute and the at least one network connection selection criteria of a plurality of networks that includes the network.

21. The non-transitory computer-readable storage medium of claim 14, wherein the instructions further comprise instructions that, upon execution by the one or more processors, determine a connection type by which to connect with the destination.

* * * * *